United States Patent
Pace et al.

(10) Patent No.: US 9,476,997 B2
(45) Date of Patent: Oct. 25, 2016

(54) METHOD FOR LOCATING SEISMIC DIFFRACTORS IN SUBSURFACE FORMATIONS FROM A WELLBORE

(71) Applicant: Acoustic Zoom, Inc., Paradise (CA)

(72) Inventors: Nicholas G. Pace, Bath (GB); Jacques Y. Guigné, Paradise (CA)

(73) Assignee: Acoustic Zoom, Inc., Paradise, NL (CA)

( * ) Notice: Subject to any disclaimer, the term of this patent is extended or adjusted under 35 U.S.C. 154(b) by 374 days.

(21) Appl. No.: 14/191,478

(22) Filed: Feb. 27, 2014

(65) Prior Publication Data
US 2015/0241583 A1    Aug. 27, 2015

(51) Int. Cl.
*G01V 1/30* (2006.01)

(52) U.S. Cl.
CPC *G01V 1/305* (2013.01); *G01V 1/30* (2013.01)

(58) Field of Classification Search
CPC ........... G01V 1/28; G01V 1/30; G01V 1/305
USPC ..................................................... 367/14, 36
See application file for complete search history.

(56) References Cited

U.S. PATENT DOCUMENTS

| | | | | |
|---|---|---|---|---|
| 3,688,249 A | * | 8/1972 | Backus | G01V 1/28 367/47 |
| 5,555,220 A | | 9/1996 | Minto | |
| 2005/0122840 A1 | * | 6/2005 | Haldorsen | G01V 1/37 367/57 |
| 2005/0219949 A1 | * | 10/2005 | Taner | G01V 1/28 367/57 |
| 2006/0015259 A1 | * | 1/2006 | Gulunay | G01V 1/28 702/14 |
| 2009/0097356 A1 | * | 4/2009 | Haldorsen | G01V 1/42 367/24 |
| 2009/0228255 A1 | * | 9/2009 | Levin | G01V 1/301 703/6 |
| 2010/0271903 A1 | * | 10/2010 | Gulati | G01V 1/42 367/38 |

OTHER PUBLICATIONS

International Search Report, International Application No. PCT/CA2015/000125.

\* cited by examiner

*Primary Examiner* — Ian J Lobo
(74) *Attorney, Agent, or Firm* — Richard A. Fagin

(57) ABSTRACT

A method for locating diffractors in subsurface formations includes actuating at least two seismic energy sources at spaced apart locations. Seismic energy is detected in the formations resulting from actuation of the two sources. Signals corresponding to the detected seismic energy are processed to remove components related to direct arrivals from each source. Arrival times of seismic energy in the signals corresponding to energy diffracted from at least one diffractor are identified. The at least one is located diffractor in a plane using the identified arrival times.

19 Claims, 7 Drawing Sheets

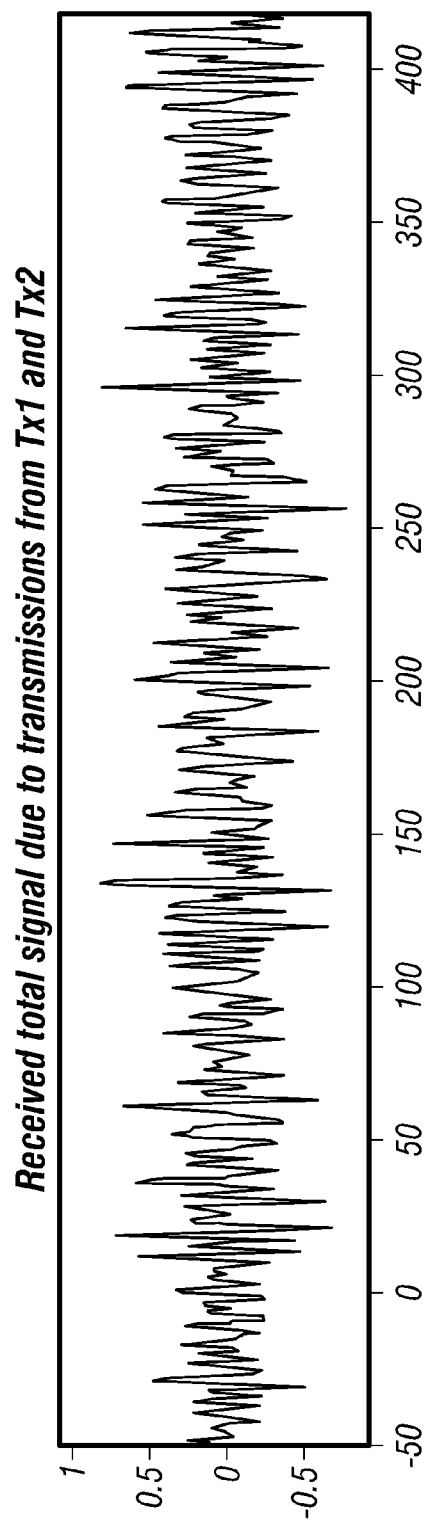
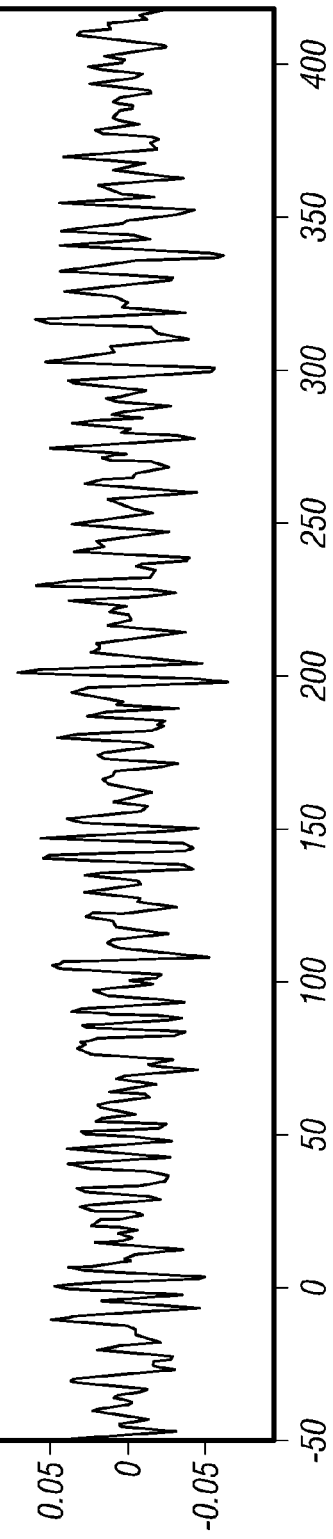
FIG. 4
FIG. 5

METHOD FOR LOCATING SEISMIC DIFFRACTORS IN SUBSURFACE FORMATIONS FROM A WELLBORE

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND

This disclosure is related to the field of seismic imaging of subsurface formations. More specifically, the disclosure concern locating spatial position of seismic diffractors in the subsurface from a wellbore, either while the wellbore is being drilled or thereafter.

Wellbore drilling through subsurface formations may be performed for the purpose of positioning such wellbores or parts thereof in formations containing useful materials such as hydrocarbons. Structures of the subsurface formations, and to some extent the composition of the formations may be determined by reflection seismic surveying techniques known in the art.

As a practical matter, reflection seismic surveying known in the art for determining structural and/or compositional features in the subsurface tend to emphasize features identifiable from specular reflections. It is known in the art that certain features in subsurface formations act as diffractors or scatters of seismic energy. In some cases, geologic properties associated with such diffractors may present drilling hazards or the properties of such diffractors may be economically useful. It is desirable to be able to determine the spatial position of such diffractors.

SUMMARY

A method according to one aspect for locating diffractors in subsurface formations includes actuating at least two seismic energy sources at spaced apart locations. Seismic energy is detected in the formations resulting from actuation of the two sources. Signals corresponding to the detected seismic energy are processed to remove components related to direct arrivals from each source. Arrival times of seismic energy in the signals corresponding to energy diffracted from at least one diffractor are identified. The at least one is located diffractor in a plane using the identified arrival times.

Other aspects and advantages will be apparent from the description and claims that follow.

BRIEF DESCRIPTION OF THE DRAWINGS

FIG. 4 shows an example of a total received signal at the receiver, including both direct arrivals and arrivals from one or more diffractors.

FIG. 5 shows an example of the total received signal in FIG. 4 after removal of the direct arrival portions of the signal.

DETAILED DESCRIPTION

Figure 1:
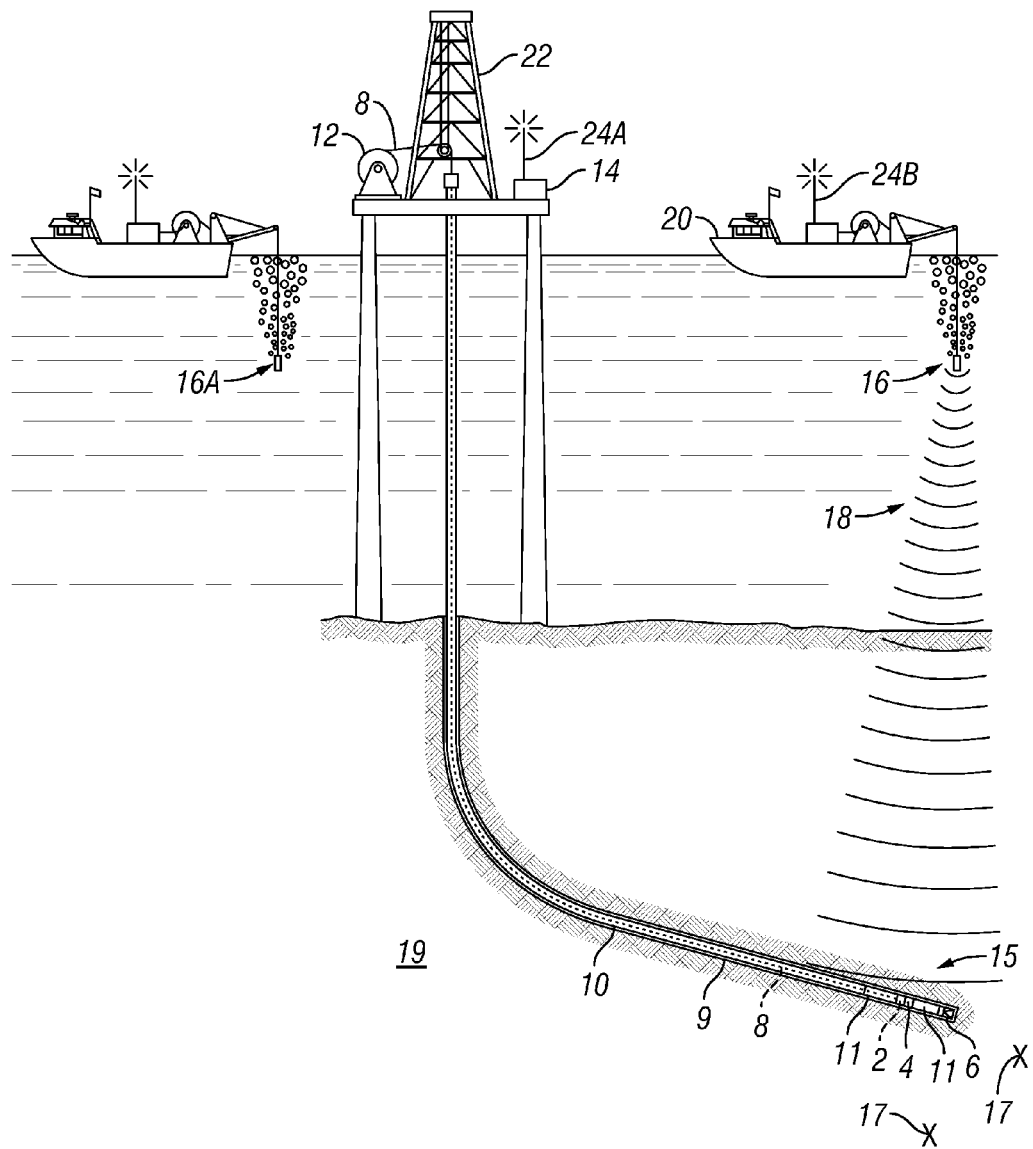
FIG. 1 shows an example technique for acquiring seismic signals for processing according to methods disclosed herein.

FIG. 1 shows an example arrangement for conducting a marine borehole geophysical survey for imaging subsurface diffractors using methods according to the present disclosure. From a drilling platform or rig 22, a borehole seismic receiver 2 may be lowered into a drill pipe 9 in a wellbore 10 by means of a winch 12 which spools a single strand steel cable 8, known as slickline. Slickline 8 may be used when servicing tools which neither need surface supplied electrical power nor transmit signals to the surface by wire or cable. The winch 12 in combination with associated control equipment is typically referred to as a slickline unit. At the end of the drill pipe 9 is a bottom hole assembly 15, or BHA, comprising drill collars 11, a muleshoe sub 4, and a drill bit 6. The BHA 15 is normally used during the drilling of the wellbore 10. When a borehole seismic survey is recorded, the drilling process may be stopped, but the drill pipe 9 and BHA 15 may remain in the same configuration as during the active drilling of the wellbore 10.

The muleshoe sub 4 is typically included in the BHA 15 to provide a landing for directional surveying instruments such as magnetic multishots. The seismic receiver 2 may also land in the muleshoe sub 4, which reduces the possibility of inducing noise in the seismic receiver 2 as a result of movement of the seismic receiver 2 while a survey is being recorded. The seismic receiver 2 may include a particle motion responsive sensor such as a single component or multi component geophone or accelerometer, or a pressure or pressure time gradient responsive sensor such as a hydrophone or combinations thereof. The seismic receiver 2 may include components (not shown in FIG. 1) for making a time-indexed recording of seismic energy detected by the sensor(s) in response to seismic energy emitted into the water. An example of a seismic receiver that may be used in some examples is shown in U.S. Pat. No. 5,555,220 issued to Minto. The receiver described in the Minto '220 patent may include a signal recorder which may be interrogated when the receiver 2 is retrieved to the surface. In other examples, the signal detected by the receiver 2 may be transmitted to the surface substantially in real time over a high bandwidth signal channel, for example, using so-called "wired" drill pipe. One type of wired drill pipe is sold under the trademark INTELLIPIPE, which is a registered trademark of IntelliSery LLC, 7909 Parkwood Circle Drive, Houston, Tex. 77036. The foregoing two examples of obtaining the signal detected by the receiver 2 are not intended to limit the scope of the present disclosure. The example receiver shown in FIG. 1 as being conveyed by slickline likewise is not intended to limit the scope of the present disclosure. Other types of seismic receivers may be coupled to the drill pipe 9 or the BHA 15 and be removable when the drill pipe 9 is removed from the wellbore 10.

A first seismic energy source 16, which in this embodiment may be a marine seismic vibrator, may be towed by a boat 20. The source 16 may be positioned at a selected distance from a position directly above the seismic receiver 2 in the wellbore 10. The first seismic energy source 16 may be controlled by radio signals 24A and 24B initiate operation thereof at a known time. The radio signals 24A and 24B may be generated by a surface control unit 14 located on the rig 22. In a land-based borehole geophysical survey, the first source 16 may be directly connected to the surface control unit 14. When the first source 16 is activated, seismic energy waves 18 travel through the earth to the receiver 2 where they are detected and recorded. In the present example, a second seismic energy source, shown at 16A may be substantially the same configuration as the first seismic energy source 16, and controlled substantially as is the first seismic energy source 16.

An example marine seismic vibrator that may be used in some examples for both the first seismic energy source 16 and the second seismic energy source 16A is describe in U.S. Pat. No. 8,446,798. Vibrators for use in land based surveys are well known in the art.

In the present example, both the first seismic energy source 16 and the second seismic energy source 16A may be actuated substantially simultaneously. Thus, seismic energy from both seismic energy sources 16, 16A may be detected in the same recording. The seismic energy detected by the receiver 2 may include direct arrivals from each source 16, 16A to the receiver 2, as well as energy scattered by diffractors 17 in the subsurface formations 19. A driver signal used to operate each seismic energy source may be selected such that a cross-correlation coefficient between the signal used to drive the first source 16 and the signal used to drive the second source 16A is substantially zero, for example, orthogonally coded driver signals. By using such driver signals, it may be possible to individually identify the portion of the signal detected by the receiver 2 corresponding to the first source 16 and the second source 16A. An example of such driver signals is described in U.S. Pat. No. 8,094,514 issued to Tenghamn. For purposes of the present description, and to simplify the calculations used in example methods described herein, it may be assumed that the sources 16, 16A are disposed along a line intersecting the position of the receiver 2. In some examples, acquisition of seismic signals may be repeated with the receiver 2 in a different position in the subsurface. Such different position may be provided by lengthening (drilling) the wellbore 10, or by moving the drill pipe 9, e.g., back out of the wellbore 10 by a selected distance.

The example shown in FIG. 1 is for drilling formations below the bottom of a body of water, and the sources 16, 16A are disposed at a known depth below the surface. It will be appreciated by those skilled in the art that methods according to the present disclosure are not limited to use with marine wellbore drilling and seismic surveying. The procedure to be explained below is equally applicable with land based seismic surveying and drilling.

Figure 2:
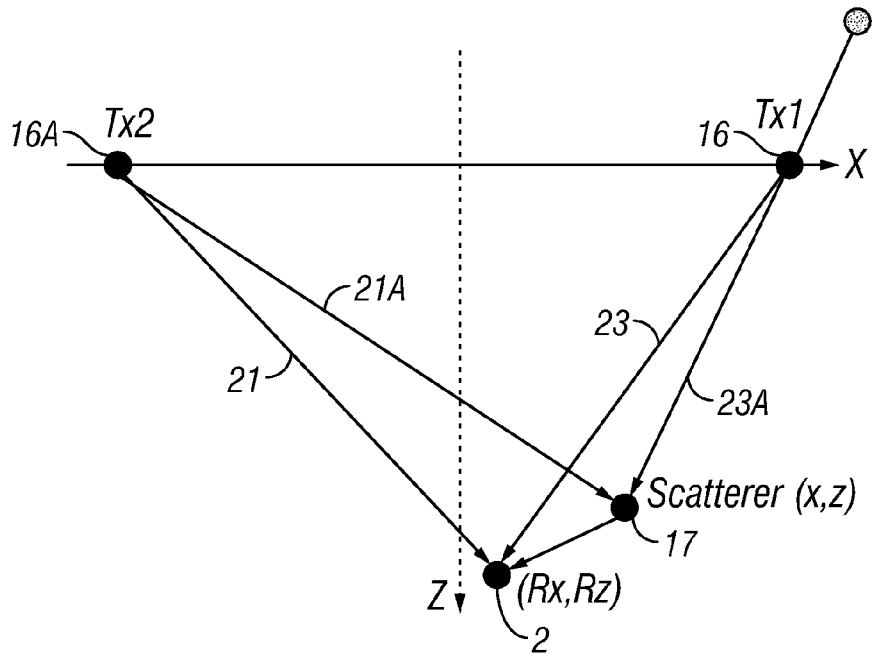
FIG. 2 shows example seismic energy travel paths from each of the sources shown in FIG. 1 to the receiver shown in FIG. 1, both directly and via a diffractor in the subsurface.

FIG. 2 shows schematically in the X,Z plane (i.e., a cross section of the arrangement of the sources 16, 16A and the receiver 2) travel paths of seismic energy from each of the sources 16, 16A to the receiver 2 both directly (along paths 21 and 23) and via a diffractor 17 in the subsurface (along paths 21A, 23A) located at a position in the X,Z plane defined by coordinates Xn,Zn. The diffractor 17 may or may not be in the X,Z plane of FIG. 2, however this fact does not affect the results of calculations performed as explained below. The travel paths are shown as straight lines for simplicity of the illustration. It will be appreciated by those skilled in the art that the actual seismic energy travel path will include the effects of refraction by reason of having various formation layers in the subsurface with different acoustic velocities therein. The X and Z coordinates of the sources 16, 16A are known. In marine surveying, Z may be set to zero for each source, or may be set to the known depth of each source. Likewise, the elevation of each source in land based surveys will determine the Z value for each source position.

It will also be appreciated by those skilled in the art that during the time seismic energy is emitted from the sources, and is detected by the receiver, it may be desirable to stop any motion of the drill pipe (9 in FIG. 1). It is known in the art that most acoustic energy associated with motion of drill pipe and drilling tools in general is within a frequency range of about zero to 8 KHz, which frequency range includes the seismic energy frequency band of interest (about 0 to 300 Hz.).

Figure 3:
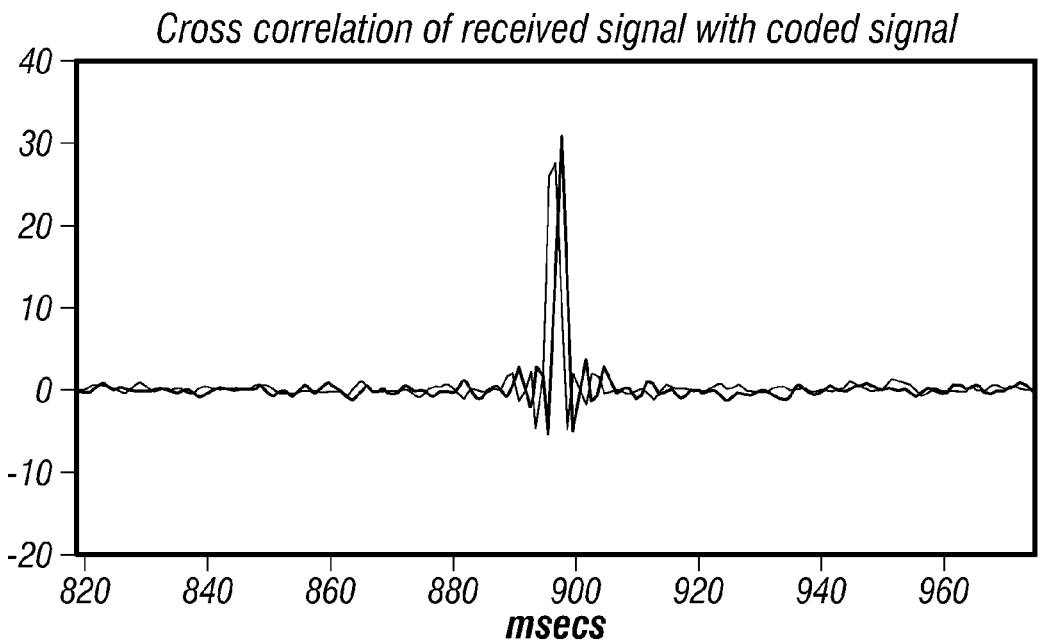
FIG. 3 shows example cross correlations between the signal recorded by the receiver and corresponding source driver signals for each of the first and second transmitters shown in FIG. 1.

Referring to FIG. 3, the total signal detected by the receiver 2 may be cross correlated with the driver signal used to actuate each source 16, 16A. A result of the cross-correlation shown in FIG. 3 is a curve which represents amplitude of an equivalent impulsive source with respect to time. Thus, an amplitude peak may be observable at a time corresponding to the direct arrival from each source 16, 16A to the receiver 2. The amplitude peaks in FIG. 3 may reasonably be expected to represent the direct arrivals from each source (16, 16A in FIG. 1) because the direct arrivals may be greater in amplitude by 30 dB or more than the amplitude of signals detected from diffractors 17 in the subsurface.

If the velocity field is a priori well known, for example by using checkshot and surface reflection seismic surveys, the direct arrival time may be used to determine the X,Z position of the receiver 2 (noting as explained above the effect of velocities on the actual travel path of the seismic energy). However it is contemplated that the X,Z position of the receiver 2 may be determined using well known wellbore directional survey instruments, such as multi-axis accelerometers and multi-axis Earth magnetic field sensors such as flux gate magnetometers. Other types of directional sensors, and techniques for determining a three dimensional trajectory of the wellbore from measurements made using such sensors are well known in the art.

Once the direct arrival time of the seismic signal at the receiver 2 from each source 16, 16A is determined, the total signal detected by the receiver 2 may be adjusted so as to remove the direct arrival component from each source 16, 16A. Such adjustment may be performed by applying the arrival time from each source 16, 16A to the receiver 2 to the starting time of the source driver signal corresponding to each source 16, 16A and subtracting the corresponding time-delayed source driver signal from the total signal detected by the receiver 2. FIG. 4 shows an example of the total detected signal at the receiver (2 in FIG. 2). FIG. 5 shows the receiver signal after adjustment by subtracting the direct arrival signal component from each source (16, 16A in FIG. 2). The adjusted signal shown in FIG. 5 includes signals that arrive from one or more diffractors (17 in FIG. 2) from each source (16, 16A in FIG. 2) and noise.

Figure 6:
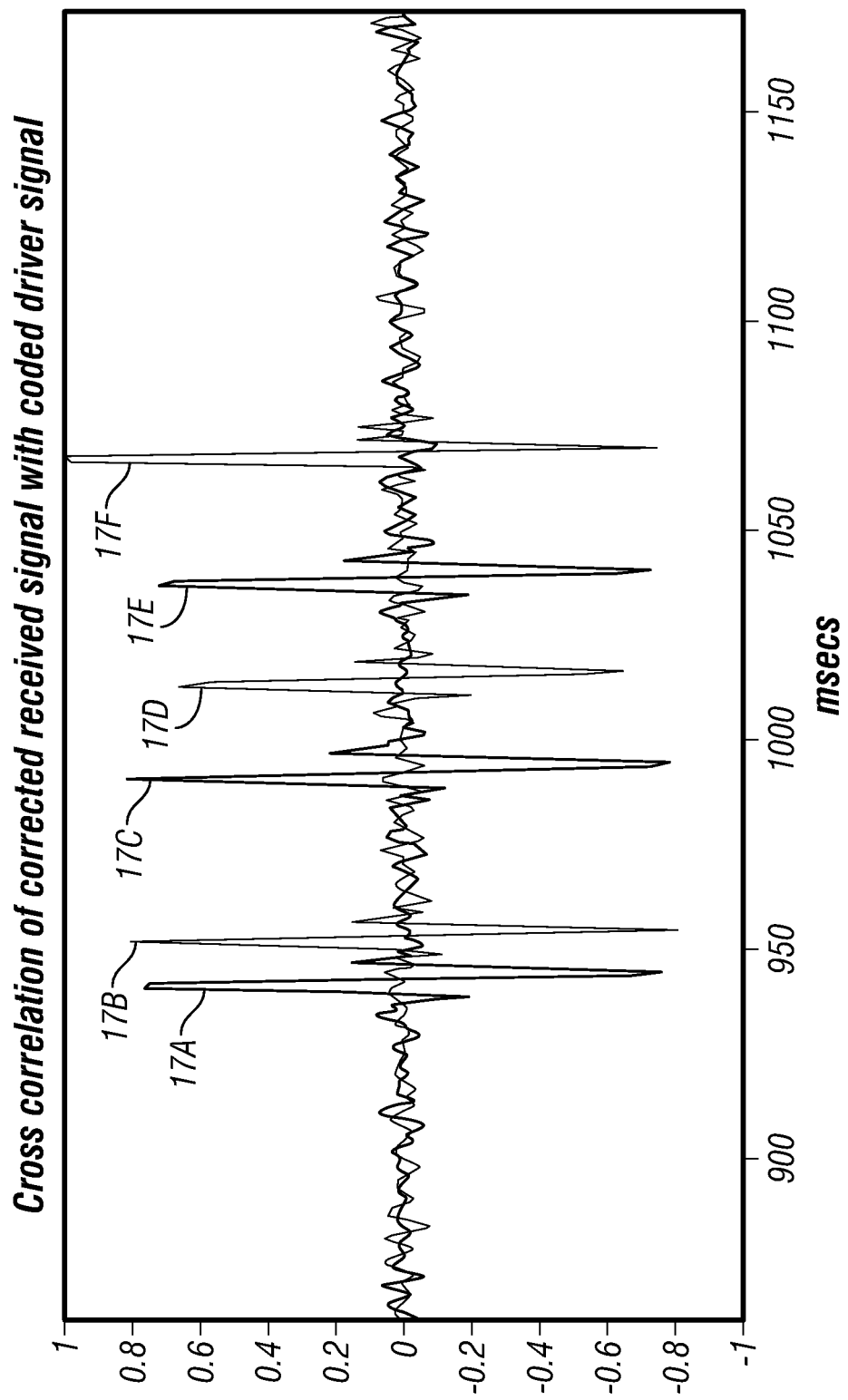
FIG. 6 shows an example of detection of diffractor arrival times obtained by cross correlation of the signal in FIG. 5 with each of the source driver signals.

The signal shown in FIG. 5 may be used to determine the arrival time of signals from one or more diffractors at the receiver (2 in FIG. 2). The foregoing arrival times may be determined by cross-correlating the adjusted signal in FIG. 5 with the source driver signal used to actuate each source. FIG. 6 shows the result of cross correlation of the adjusted signal in FIG. 5 with the driver signal used for the first source (16 in FIG. 2), wherein energy arrivals from diffractors are shown at 17A, 17C and 17E. A cross correlation of the adjusted signal with the driver signal used to operate the second source (16A in FIG. 2) is shown with amplitude peaks at 17B, 17D and 17F corresponding to arrivals of seismic energy from the second source (16A in FIG. 2) through a diffractor and to the receiver. The amplitude peaks 17B, 17D, 17F in the cross correlation curves occur at times corresponding to travel time of seismic energy from an impulsive source located at a same position as the sources (16, 16A in FIG. 2) through one or more diffractors (17 in FIG. 2) to the receiver (2 in FIG. 2).

The result of the foregoing cross correlations, signal adjustment and subsequent cross correlation of the adjusted signal is a set of seismic travel times from the position of each source, both directly (e.g., along paths 21 and 23 in FIG. 2) and through one or more diffractors (e.g., along paths 21A and 23A in FIG. 2) to the receiver (2 in FIG. 2).

Figure 7:
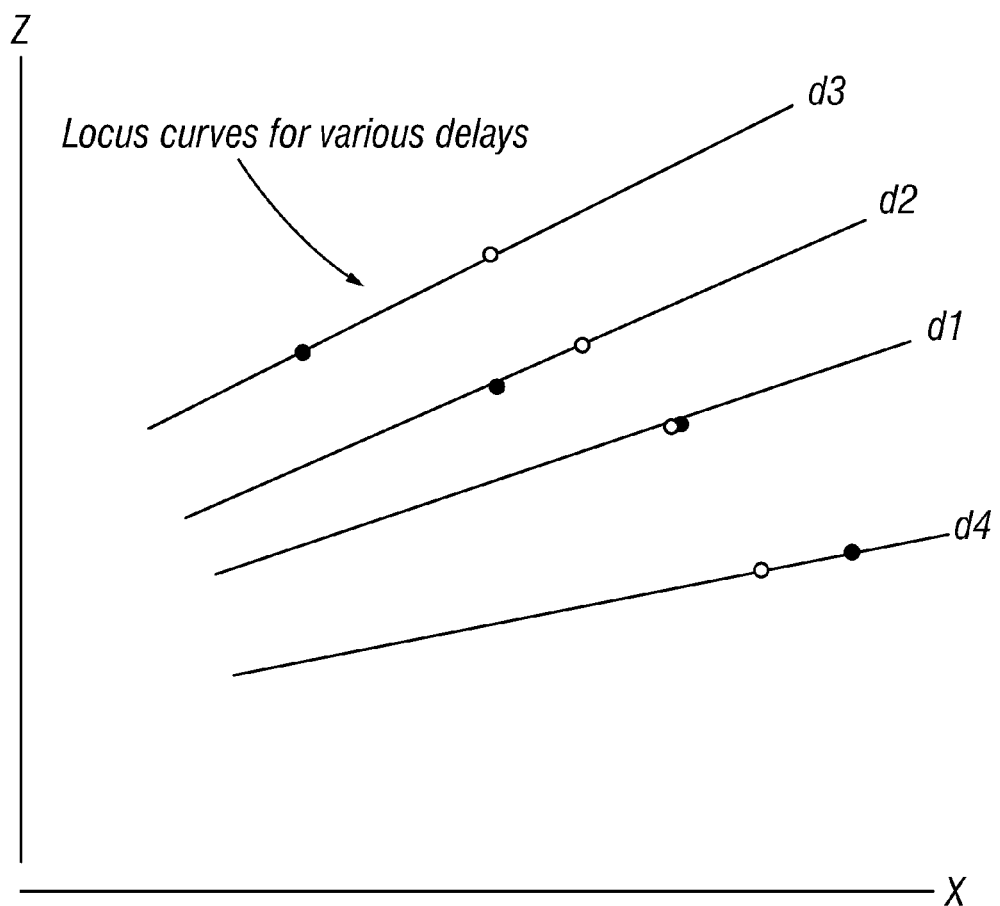
FIG. 7 shows an example of loci of points defining X,Z positions of diffractors for various values of time delay inserted into the detected signal from the diffractors such that arrival times at the receiver are the same for each of the sources.

Once the arrival times of the seismic energy from each source, through the one or more diffractors to the receiver are determined, a randomly selected time delay may be added to the signal arriving from one source, e.g., 16 in FIG. 2 so that the signal arrival from a same diffractor is substantially at the same time along a locus of points of possible X,Z positions of the same diffractor whose signal arrives from the at least one other source, e.g., 16A in FIG. 2. The foregoing may be repeated, and additional loci in the X,Z plane of possible diffractor positions may be determined using different values of time delay. The foregoing is illustrated in FIG. 7 for time delays shown at $d_4$, $d_1$, $d_2$ and $d_3$.

The locus of points (X,Z) for simultaneous arrival of the transmissions at a receiver position (Rx,Rz) is found from the solution of the expression:

$$(-x_0-x)^2 = (x_0 + d \sin \alpha - x)^2 + (-d \cos \alpha - z)^2$$

where $x_0$ and $-x_0$ represent the X positions of the first and second seismic energy sources, respectively. x may be obtained for a given range of Z for a given value of time delay d, expressed here by an equivalent distance, by an optimization procedure, where α is:

$$\alpha = \tan^{-1} \frac{(x_0 - x)}{z}$$

Having applied a delay to the received diffractor signal from one source as described earlier, and having determined a locus of possible diffractor positions in the X,Z plane, the arrival time for signals thought to be arriving from a diffractor located on the locus can be readily calculated. The arrival time may then be inverted to obtain the value of Z on the locus corresponding to that arrival time. This may be performed, for example, by fitting a polynomial to Z with respect to arrival time using the calculated arrival time with respect to Z.

Most diffractor arrivals will not in reality originate from a position in the X,Z plane on the locus in question. However they may be placed at a position on the locus which is not their actual origin. If the position given to a particular diffraction arrival by a series of delays is plotted in the X-Z plane, the position will lie on a curve herein called a "misplacement curve." The arrival from the same diffractor from the at least two sources will have different shaped misplacement curves for each source. These misplacement curves will intersect at the X,Z position of the diffractor in question. The shape of the misplacement curve depends on both the source separation and the position of the receiver relative to the diffractor. In practice there will be as many misplacement curves as there are diffractors and curves from one diffractor may intersect with the misplacement curves of other diffractors. Such intersections may change in position with change in receiver positions, whereas the intersections of misplacement curves pertaining to the same diffractor do not move with respect to receiver movement. Thus it is possible to determine the X,Z position of a particular diffractor using the intersection of the misplacement curves generated using at least two receiver positions, or by moving at least one of the sources (16, 16A in FIG. 1).

Figure 8:
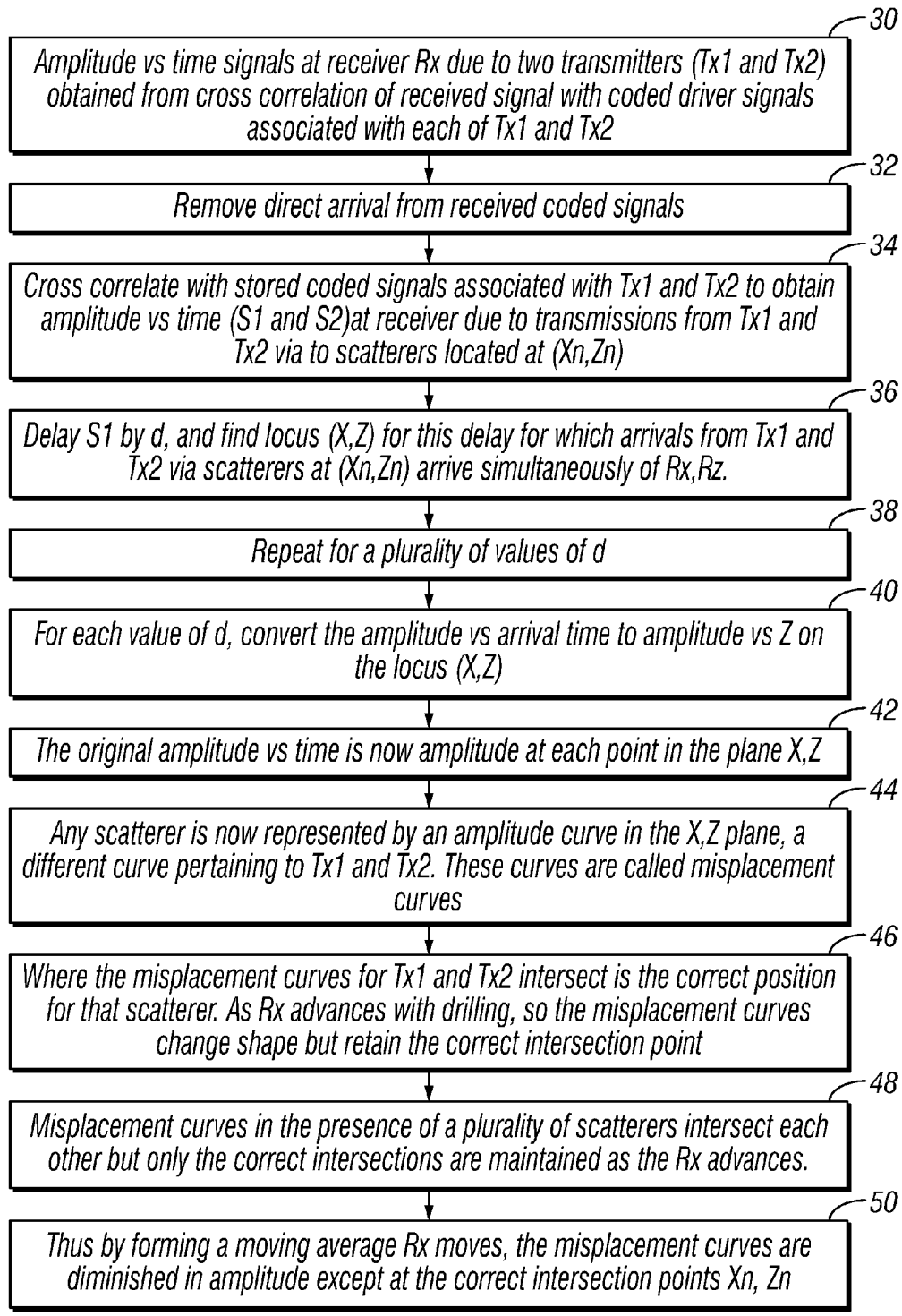
FIG. 8 shows a flow chart of an example signal processing method.

A flow chart of an example data processing method according to the present disclosure is shown in FIG. 8.

At 30, amplitude vs time signals at the receiver resulting from each of at least two seismic energy sources (Tx1 and Tx2) may be obtained from cross correlation of the received signal with the uncorrelated driver signals associated with Tx1 and Tx2. Direct arrivals may be determined by cross correlation as explained above.

At 32, the direct arrivals may be used to adjust the received signal by removing the components resulting from direct arrival of seismic energy from each of the sources at the receiver. As explained above, removal of the direct arrival components may be performed by time adjusting each source driver signal by the direct arrival time associated with each source and subtracting such time adjusted driver signals from the total received signal.

At 34, energy arrivals from diffractors may be determined by cross correlating the adjusted received signal (at 32) with each source's driver signal. The result of the cross correlation will be an amplitude curve with respect to time equivalent to that obtained using an impulsive source whose energy travel path includes at least one diffractor.

At 36, delay the signal 51 (from the first source Tx1) by a selected delay time dn, and find a locus (X,Z) for this delay for which arrivals from the at least two sources via diffractors on the locus (X,Z) arrive simultaneously at the receiver.

At 38, the foregoing at 36 is repeated for a plurality of values of delay d.

At 40, for each value of time delay d, the amplitude vs arrival time is converted to amplitude vs Z on the locus (X,Z).

At 42, the original amplitude with respect to time is converted to amplitude at each point in the plane X,Z.

At 44 any diffractor is now represented by an amplitude curve in the X,Z plane, a different curve for each diffractor pertaining to each of the first source and the second source. These curves are called misplacement curves.

At 46, where the misplacement curves for the two sources intersect is the correct position in the X,Z plane for one diffractor. As the receiver is moved (e.g., advances with drilling), the misplacement curves change shape but retain the correct intersection point. In this way, the correct position in the X,Z plane may be identified.

At 48, the misplacement curves in the presence of a plurality of diffractors intersect each other but only the intersections corresponding to the correct diffractor positions are maintained as the receiver changes position.

At 50, by forming a moving average of the misplacement curves as drilling continues or for various receiver positions, the misplacement curves are greatly diminished except at the correct intersection points.

The foregoing may be repeated with the sources orthogonally positioned with respect to the position of the receiver so as to determine the positions of the diffractors in the Y,Z plane. Thus, the position in space X,Y,Z of each diffractor may be determined.

Arrivals from diffractors located behind the receiver (when the diffractor position is at x<Rx and z<Rz, wherein Rx,Rz is the receiver position) may cause ambiguities in the calculated results but such ambiguities can be reduced significantly by using two receivers in the drill pipe or BHA separated by about 5 m. Another possibility is to move the drill pipe with the receiver as shown in FIG. 1 by about 5 meters and repeating the source actuation, signal recording and signal processing as described above. The foregoing procedure works best when the diffractor behind the receiver is at about the same depth as the receiver. As the diffractor depth moves away from the receiver depth, the performance of the foregoing procedure may be correspondingly reduced.

The above procedure described with reference to FIGS. 1 through 8 may be repeated with the sources (16, 16A in FIG. 1) placed orthogonally to their respective positions as in FIG. 1, or, two additional sources so placed may be used. By implementing the foregoing procedure with orthogonally placed sources, it may be possible to determine the position of diffractors in the Y,Z plane. Having already located the positions of diffractors in the X,Z plane, locating the diffractors in the Y,Z plane will provide the three dimensional position, X,Y,Z of each diffractor.

It will be appreciated by those skilled in the art that seismic energy detected by the receiver may include reflections from specular reflectors such as formation layer boundaries at a depth below the Z position of the receiver. It may be possible to identify specular reflectors separately from diffractors in the signals detected by the receiver so that the diffractors are properly identified and located. At a smooth, substantially horizontal interface, e.g., a formation layer boundary, the specular reflection arrival at the receiver from each source is necessarily associated with different points on the interface. If the arrival from the first source is delayed (as above by a predetermined time delay d) to make the arrival times from both sources be the same, then it may be observed that for specular rays the reflection points on the interface do not change. However, as the receiver moves, so the reflection points on the interface for specular reflections will move.

So if the delay is calculated correctly, the specular reflection arrivals will add together to give an increased amplitude in the misplacement curves. As the receiver moves, however this increased amplitude will still be associated with two separate points on the interface, but both will move along the interface corresponding to motion of the receiver. If the interface is truly a smooth reflecting interface then its presence will appear as a line in the moving average (calculated as explained above) as the receiver moves. If any particular interface is rough rather than a smooth surface, and any point on the interface acts as a diffractor, the same principles as explained above with respect to determining position of diffractors with respect to arrival time delay, loci of possible positions, etc. will apply and the rough interface may be expected to appear as a line just as for a smooth interface.

Figure 9:
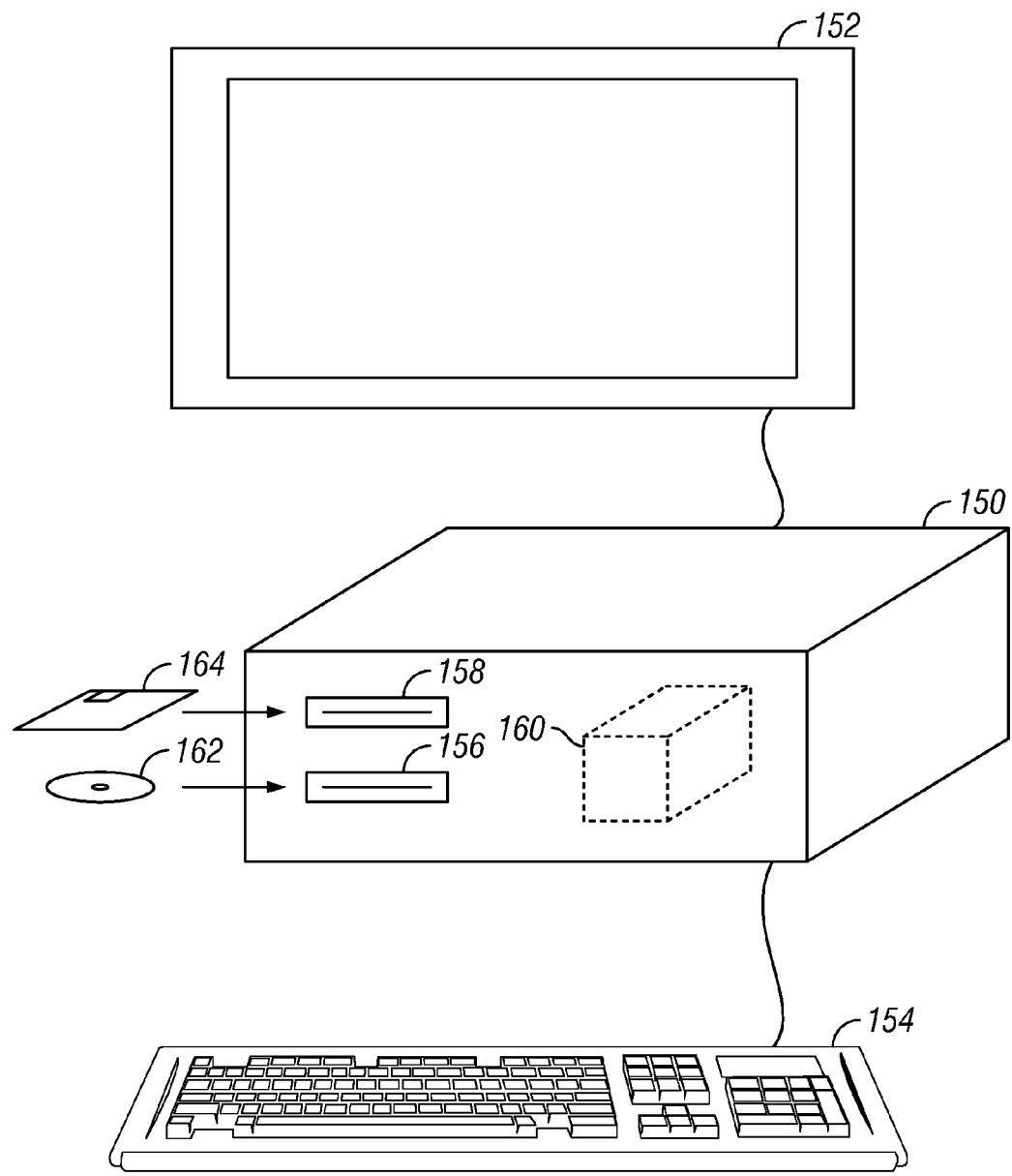
FIG. 9 shows an example computer system.

In another aspect, the disclosure relates to non-transitory computer readable media having computer programs stored thereon. Referring to FIG. 9, the foregoing process as explained with reference to FIGS. 2 through 8 can be embodied in computer-readable code. The code can be stored on a computer readable medium, such as floppy disk 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. The computer may form part of the recording unit (12 in FIG. 1) or may be another computer. According to this aspect of the invention, the computer readable medium includes logic operable to cause the computer to execute acts as set forth above and explained with respect to the previous figures. The calculations described above, as well as the misplacement curves, coordinate graphs and similar presentations may also be presented on the user display 152 for interpretation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for locating diffractors in subsurface formations, comprising:
   a) actuating at least two seismic energy sources at spaced apart locations;
   b) detecting seismic energy in the subsurface formations resulting from actuation of the at least two sources;
   c) in a computer, processing signals corresponding to the detected seismic energy to remove components therein related to direct arrival of seismic energy from each source;
   d) in the computer, identifying arrival times of seismic energy in the processed signals corresponding to energy diffracted from at least one diffractor in the subsurface formations from each source;
   e) applying a plurality of values of time delay to the arrival times of the seismic energy corresponding to the energy diffracted from the at least one diffractor from the at least two sources to define a locus of points corresponding to the at least one diffractor;
   (f) in the computer, identifying an intersection of the locus of points corresponding to each source to locate the position of the at least one diffractor in a plane.

2. The method of claim 1 wherein the plane includes positions of the at least two seismic energy sources and a position of the detecting seismic energy.

3. The method of claim 1 wherein the at least two seismic energy sources are actuated substantially simultaneously.

4. The method of claim 3 wherein the at least two seismic energy sources comprise seismic vibrators each driven by a signal having substantially zero correlation with the other signal.

5. The method of claim 4 wherein the removing the direct arrival components comprises determining a direct arrival time at a seismic receiver of energy from each of the at least two sources, applying the arrival time to the corresponding driver signal and subtracting arrival time shifted driver signals from the detected seismic energy.

6. The method of claim 5 wherein the identifying arrival times of diffracted seismic energy comprises cross correlating the detected seismic energy having the direct arrival components removed therefrom with the driver signal for each of the at least two seismic energy sources.

7. The method of claim 1 wherein the detecting seismic energy is performed by a receiver disposed in a pipe used to drill a wellbore.

8. The method of claim 7 further comprising moving the receiver a selected distance and repeating (a) through (Original) to resolve ambiguities in location of the at least one diffractor.

9. The method of claim 1 further comprising actuating at least two spaced apart seismic energy sources at additional spaced apart positions orthogonal the at least two spaced apart locations, and repeating (b) through (f) to locate the at least one diffractor in three dimensions.

10. The method of claim 9 wherein the detecting seismic energy is performed by a receiver disposed in a pipe used to drill a wellbore.

11. The method of claim 10 further comprising moving the receiver a selected distance and repeating (a) through (f) to resolve ambiguities in location of the at least one diffractor.

12. A non-transitory computer readable medium having logic thereon to cause a programmable computer to perform actions comprising:
   a) causing the computer to accept as input signals corresponding to seismic energy detected by a receiver disposed in subsurface formations, the detected energy resulting from actuation of at least two spaced apart seismic energy sources;
   b) processing the signals to remove components therein related to direct arrival of seismic energy from each source;
   c) identifying arrival times of seismic energy in the processed signals corresponding to energy diffracted from at least one diffractor in the subsurface formations from each source;
   d) in the computer, using the identified arrival times to locate the at least one diffractor;
   e) applying a plurality of values of time delay to the arrival times of the seismic energy corresponding to the energy diffracted from the at least one diffractor from the at least two sources to define a locus of points corresponding to the at least one diffractor;
   (f) in the computer, identifying an intersection of the locus of points corresponding to each source to locate the position of the at least one diffractor in a plane.

13. The non-transitory computer readable medium of claim 12 wherein the logic comprises instructions to cause the computer to perform further acts, comprising accepting as input to the computer signals detected by the receiver after the receiver is moved a selected distance and repeating (a) through (f) to resolve ambiguities in location of the at least one diffractor.

14. The non-transitory computer readable medium of claim 12 wherein the logic comprises instructions to cause the computer to perform further acts, comprising accepting as input to the computers signal detected by actuating at least two spaced apart seismic energy sources at additional spaced apart positions orthogonal the at least two spaced apart locations, and repeating (a) through (f) to locate the at least one diffractor in three dimensions.

15. The non-transitory computer readable medium of claim 12 wherein the using identified arrival times comprises (g) defining a plurality of loci of points in the plane corresponding to a position in the plane of the at least one diffractor generated for a plurality of time delays resulting in simultaneous arrival of seismic energy at a position of the detecting for the at least one diffractor and (h) locating the diffractor in the plane using the plurality of loci.

16. The non-transitory computer readable medium of claim 12 wherein the at least two seismic energy sources are actuated substantially simultaneously.

17. The non-transitory computer readable medium of claim 16 wherein the at least two seismic energy sources comprise seismic vibrators each driven by a signal having substantially zero correlation with the other signal.

18. The non-transitory computer readable medium of claim 17 wherein the removing the direct arrival components comprises determining a direct arrival time at a seismic receiver of energy from each of the at least two sources, applying the arrival time to the corresponding driver signal and subtracting arrival time shifted driver signals from the detected seismic energy.

19. The non-transitory computer readable medium of claim 18 wherein the identifying arrival times of diffracted seismic energy comprises cross correlating the detected seismic energy having the direct arrival components removed therefrom with the driver signal for each of the at least two seismic energy sources.

* * * * *